United States Patent
Dumalski

(10) Patent No.: US 10,190,668 B2
(45) Date of Patent: Jan. 29, 2019

(54) VEHICLE DIFFERENTIAL LOCK DISENGAGEMENT BYPASS

(71) Applicant: Brandt Road Rail Corporation, Regina (CA)

(72) Inventor: Josh Dumalski, Regina (CA)

(73) Assignee: Brandt Road Rail Corporation, Regina, Saskatchewan (CA)

( * ) Notice: Subject to any disclaimer, the term of this patent is extended or adjusted under 35 U.S.C. 154(b) by 668 days.

(21) Appl. No.: 14/865,812

(22) Filed: Sep. 25, 2015

(65) Prior Publication Data

US 2016/0010737 A1   Jan. 14, 2016

Related U.S. Application Data

(62) Division of application No. 13/833,937, filed on Mar. 15, 2013, now Pat. No. 9,429,220.

(51) Int. Cl.
  *F16H 48/20* (2012.01)
  *F16H 48/32* (2012.01)
  *B60K 23/04* (2006.01)

(52) U.S. Cl.
  CPC .............. *F16H 48/32* (2013.01); *F16H 48/20* (2013.01); *B60K 2023/046* (2013.01); *B60Y 2200/30* (2013.01); *F16H 2048/204* (2013.01)

(58) Field of Classification Search
  CPC .... F16H 48/20; F16H 48/32; F16H 2048/204; B60K 2023/046; B60Y 2200/30
  See application file for complete search history.

(56) References Cited

U.S. PATENT DOCUMENTS

| | | |
|---|---|---|
| 3,690,426 A | 9/1972 | Weisgerber |
| 4,167,881 A | 9/1979 | Bell et al. |
| 4,213,588 A | 7/1980 | Bowles |
| 4,280,583 A | 7/1981 | Stieg |
| 5,016,544 A | 5/1991 | Woollam |
| 5,054,573 A | 10/1991 | Bennett |
| 5,133,696 A | 7/1992 | Kobayashi |
| 5,366,041 A | 11/1994 | Shiraishi et al. |
| 6,578,648 B2 | 6/2003 | Bell |
| 6,598,538 B2 | 7/2003 | Semple et al. |
| 6,719,082 B2 | 4/2004 | Uematsu et al. |
| 7,044,878 B2 | 5/2006 | Murakami |
| 7,156,603 B2 | 1/2007 | Marcotte |
| 7,318,511 B2 | 1/2008 | Grogg |
| 8,668,615 B2 | 3/2014 | Schmidt et al. |
| 2004/0097323 A1* | 5/2004 | Duan ............... F16D 25/061 475/254 |
| 2014/0274525 A1 | 9/2014 | Dumalski |

FOREIGN PATENT DOCUMENTS

| | | |
|---|---|---|
| JP | H054530 A | 1/1993 |
| JP | H05338521 A | 12/1993 |
| JP | 3797123 B2 | 7/2006 |
| JP | 3926528 B2 | 6/2007 |
| JP | 4030082 B2 | 1/2008 |
| WO | WO 02/49896 A1 | 6/2002 |

\* cited by examiner

*Primary Examiner* — Huan Le
(74) *Attorney, Agent, or Firm* — Frost Brown Todd LLC

(57) ABSTRACT

A method and system for bypassing a control valve that would otherwise disengage differential and/or inter-axle locking means. The bypass is achieved by a valve that can be actuated by a vehicle condition change.

7 Claims, 1 Drawing Sheet

VEHICLE DIFFERENTIAL LOCK DISENGAGEMENT BYPASS

This application is a division of and claims priority to and benefit of U.S. application Ser. No. 13/833,937, filed Mar. 15, 2013, entitled "Vehicle Differential Lock Disengagement Bypass," which is incorporated herein by reference in its entirety for all purposes.

FIELD

The present disclosure relates to differential locking systems on vehicles, and specifically to such systems where incorporating an automatic lock disengagement mechanism.

BACKGROUND

It is well known in the art of motor vehicle design to provide a differential to enable wheels at opposed ends of an axle to rotate at different speeds, for example to avoid undue tire wear. It is also well known to provide certain vehicles with a locking differential which selectively forces the wheels to rotate at the same speed no matter what the difference in traction, thereby providing a tractive advantage in some circumstances.

Also, inter-axle differentials have been developed for use on vehicles with multiple axles, whereby the differential can be locked and power is transmitted equally to all axles. The locking differential system locks the wheels on an axle, while the inter-axle system locks the multiple axles together thereby forcing the drivetrain to transmit power to all axles equally for maximum traction. In the case of certain vehicles designed for pulling heavy loads, such as a road/rail power unit when in rail operation mode, it is important that the differential and inter-axle locks remain engaged during operation.

Despite the advantages of the selective locking system, it has been determined that in certain circumstances it may be desirable to disengage the locks and later re-engage them, and such disengagement means have become a factory standard addition. For example, in some trucks the inter-axle lock may be designed to automatically disengage in response to a condition such as a low-traction event in which the anti-lock braking system (ABS) initiates, which allows for more effective braking. The lock then re-engages automatically after cessation of the low-traction event.

However, the automatic nature of the lock disengagement is problematic in other contexts. The locks are designed primarily to maximize traction, and an operator hauling a heavy load may therefore wish to have the locks engaged at all times during hauling even when faced with intermittent low-traction events. In the case of snow plows ascending an icy slope, disengagement of the inter-axle lock can reduce adhesion and terminate the ascent, and similar situations have been noted with logging trucks pulling heavy loads on washboard road surfaces. As a further example, it is critical in a road/rail vehicle in rail transport operation mode that traction not be lost when pulling railcars, but it is common to experience traction loss or slippage on a rail that could result in ABS initiation and lock disengagement, and subsequent automatic re-engagement under load can damage the differentials and axles.

What is needed, therefore, is a system and method for selectively bypassing the factory differential lock disengagement means.

BRIEF SUMMARY

The present disclosure therefore seeks to provide a method and system for selectively bypassing the differential lock disengagement means.

According to a first aspect, then, there is provided a method for selectively bypassing a disengagement system for differential locking means in a vehicle having a selectively lockable differential, the differential locking means disengageable by means of a control valve in communication with the differential locking means, the method comprising the steps of:
 a. providing a bypass valve moveable between first and second positions;
 b. positioning the bypass valve between the control valve and the differential locking means;
 c. setting the bypass valve in the first position, thereby allowing unimpeded communication between the control valve and the differential locking means; and
 d. selectively actuating the bypass valve to move the bypass valve to the second position, thereby blocking communication between the control valve and the differential locking means and preventing disengagement of the differential locking means.

In exemplary embodiments of the first aspect, the disengagement system disengages the differential locking means in response to a low-traction event. The differential locking means are preferably fluid-powered and the control valve is a solenoid valve capable of controlling fluid feed to the differential locking means. The vehicle is most preferably provided with a pneumatic system capable of use with the differential locking means. The communication between the control valve and the differential locking means is preferably fluid communication, with the bypass valve a pneumatic valve configured to control passage therethrough of a working gas. The step of setting the bypass valve in the first position is preferably achieved by biasing the bypass valve in the first position. The step of selectively actuating the bypass valve to move the bypass valve to the second position is preferably achieved by introduction of working gas pressure to an actuator of the bypass valve, which introduction of working gas pressure preferably occurs in response to a vehicle condition change; where the vehicle is a road/rail vehicle, the vehicle condition change is preferably inflation of air bags during conversion to a rail mode of vehicle operation.

According to a second aspect, there is provided a bypass system for use with a disengagement system for differential locking means in a vehicle having a selectively lockable differential, the differential locking means powered by a power fluid selectively allowed by disengagement control means, the bypass system comprising:
valve means for receiving a power fluid alternatively from the disengagement control means in a first position and a power fluid source in a second position;
biasing means for biasing the valve means in the first position;
actuation means for switching the valve means from the first position to the second position; and
power fluid transfer means for supplying the disengagement control means and the valve means;
such that in the first position, the valve means allows unimpeded power fluid flow between the disengagement control means and the differential locking means; and
in the second position, the valve means blocks power fluid flow between the disengagement control means and the differential locking means and thereby prevents disengagement of the differential locking means by the disengagement control means while allowing power fluid flow directly from the power fluid source to the differential locking means.

In exemplary embodiments of the second aspect, the disengagement system disengages the differential locking means in response to a low-traction event, the disengagement control means comprise a solenoid valve capable of controlling power fluid feed to the differential locking means, and the power fluid is a pressurized gas. The actuation means preferably move the valve means to the second position by introduction of power fluid to an actuator of the valve means, which introduction of power fluid occurs in response to a vehicle condition change; where the vehicle is a road/rail vehicle the vehicle condition change is inflation of air bags during conversion to a rail mode of vehicle operation.

A detailed description of an exemplary embodiment of the present invention is given in the following. It is to be understood, however, that the invention is not to be construed as being limited to this embodiment.

BRIEF DESCRIPTION OF THE DRAWING

In the accompanying drawings, which illustrate an exemplary embodiment.

An exemplary embodiment of the method and system of the present disclosure will now be described with reference to the accompanying drawings.

DETAILED DESCRIPTION

A pneumatic control system is described in the following, but it will be clear to those skilled in the art that the bypass method and system of the present disclosure could be applied with any other suitable system including a hydraulic control system. Only those parts or components of the vehicle systems that are necessary for an understanding of the present disclosure will be described herein, as those skilled in the art will fully understand the broader mechanical and operational context of the bypass system of the present disclosure and its application in particular situations.

In prior art systems, a solenoid valve is inserted in the air feed line between the air source and the differential lock and inter-axle lock (the differential lock and inter-axle lock collectively referred to herein as the "differential lock" or "lock"). The solenoid therefore acts as a gate to alternatively allow or restrict air flow to the lock depending on the solenoid design. As explained above, such solenoids are designed to respond to ABS initiation (low-traction events) to block air flow to the locks, thereby disengaging the locks, and then subsequently allow air flow back to the locks once the trigger event has ceased.

Figure 1:
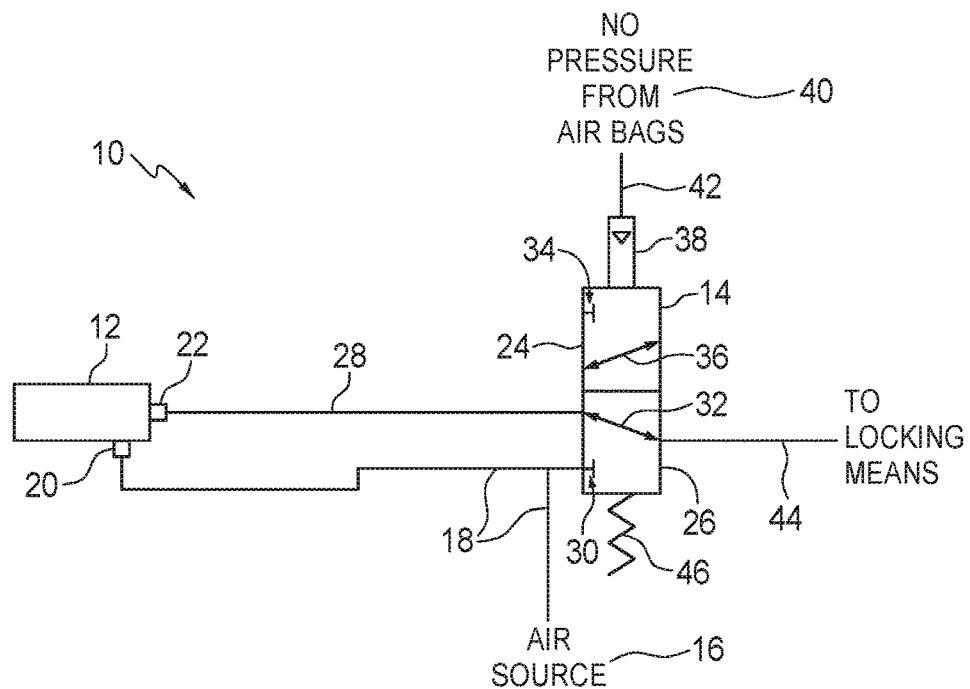
FIG. 1 is a simplified schematic view of a bypass system in the un-actuated position.
Figure 2:
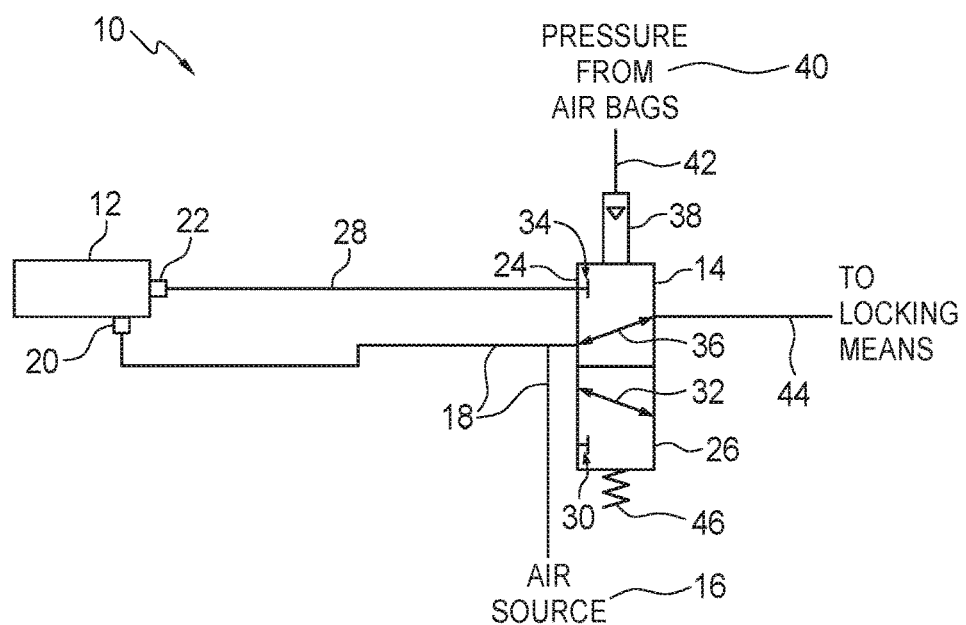
FIG. 2 is a simplified schematic view of the bypass system of FIG. 1 in the actuated position.

Turning now to FIGS. 1 and 2, a bypass system 10 is illustrated. The method and system will be described with reference to these Figures.

In the bypass system 10, the factory standard control valve 12 (a solenoid) is in place between the air source 16 and the output line 44 to the differential locks. The control valve 12 is fed by a feed line 18 from the air source 16 and comprises an inlet 20 and an outlet 22, the outlet 22 feeding air to an output line 28. This portion of the illustrated embodiment is similar to the prior art design, and the control valve 12 is wired to receive signals from the ABS in a conventional manner that will not be described further herein. The bypass system 10 also comprises a bypass valve 14, which in the illustrated embodiment is an air piloted three-port air valve. The bypass valve 14 is operated remotely by pneumatic signals provided by pressurized gas, as will be explained below.

The bypass valve 14 comprises upper and lower blocks 24, 26. The upper block 24 comprises a closed port 34 and an open port 36, while the lower block 26 comprises a closed port 30 and an open port 32. The bypass valve 14 further comprises an actuator 38 that is controlled by means of an air bag air pressure source 40 and pressurized air supply line 42, the actuator 38 of conventional design.

The bypass valve 14 is biased by means of a spring 46 into a first position, which is illustrated in FIG. 1, and there is no counteracting pressure 40 through supply line 42 to signal the actuator 38 to switch the bypass valve 14 to the second position. In this first position, pressurized air is supplied to the differential locks through the control valve 12. Pressurized air is provided by the air source 16 and is forced through the feed line 18. As the lower port 30 of the lower block 26 is closed, the pressurized air must flow to the control valve 12 through the inlet 20. At this point, the control valve 12 will either allow the pressurized air to flow through the outlet 22, output line 28 and open port 32 of the lower block 26 to the output line 44 to the locks (in which case the differential is locked) or will block the flow of pressurized air to the locks (in which case the differential is unlocked). In the exemplary embodiment, the control valve 12 is configured to receive a signal from the vehicle ABS, such that the control valve 12 blocks air flow in response to initiation of an ABS event and subsequently allows air flow in response to a signal indicating cessation of the ABS event. In the first position, then, the control valve 12 determines on an automatic basis whether the locks will be engaged or disengaged.

In a road/rail vehicle, this first position would normally be preferred when the vehicle is in the road transport mode of operation. In the rail transport mode of operation, however, this would be problematic, as described above. The bypass valve 14 is accordingly capable of shifting to a second position as described below.

The bypass valve 14 can be shifted into the second position, as illustrated in FIG. 2. When it is desired to operate a road/rail vehicle in a rail transport mode of operation, for example, air bags are inflated to lower the rail gear relative to the vehicle body and push the vehicle body upwardly, such that the rubber tires are elevated and the rail wheels can engage the rails. Inflating the air bags 40 sends pressurized air through the supply line 42 to the actuator 38 of the bypass valve 14, thereby countering the force of the spring 46 and switching the bypass valve 14 to the second position. For other vehicles, other means of signalling the actuator 38 would be appropriate and within the knowledge of those skilled in the art.

In the second position, the upper block 24 is now engaged. Pressurized air is provided by the air source 16 and is forced through the feed line 18, but the lower port 36 is open and pressurized air can therefore flow directly through the bypass valve 14 to the output line 44 for the differential locks. The upper port 34 is closed, with the result that pressurized air fed through the feed line 18 and inlet 20 to the control valve 12 can pass through the outlet 22 into the output line 28 but is blocked from passing through the bypass valve 14. Therefore, in the second position, the effect of the control valve 12 is negated such that it does not impact pressurized air supply to the locks, while a direct open supply of pressurized air to the locks is supplied through the open port 36. Pressurized air is accordingly constantly supplied to the locks during this bypass phase, such that the locks remain engaged even in the event of a low-traction event triggering the control valve 12 flow restriction.

When the bypass valve 14 is switched back to the first position, the control valve 12 once again can automatically allow or restrict pressurized air supply to the locks, as shown in FIG. 1. In the case of a road/rail vehicle, for example, this would occur when the vehicle was converted from a rail transport mode of operation to a road transport mode of operation by deflation of the air bags and release of the pressure on the actuator 38.

The foregoing is considered as illustrative only of the principles of the invention. The scope of the claims should not be limited by the exemplary embodiment set forth in the foregoing, but should be given the broadest interpretation consistent with the specification as a whole.

What is claimed is:

1. A bypass system for use with a disengagement system for a differential lock in a vehicle having a selectively lockable differential, the differential lock powered by a power fluid selectively allowed by a disengagement control valve, the bypass system comprising:
   a bypass valve for receiving the power fluid alternatively from the disengagement control valve in a first position and a power fluid source in a second position;
   a biasing member for biasing the bypass valve in the first position;
   a bypass valve actuator for switching the bypass valve from the first position to the second position; and
   power fluid transfer lines for supplying the power fluid to the disengagement control valve and the bypass valve;
   such that in the first position, the bypass valve allows unimpeded flow of the power fluid between the disengagement control valve and the differential lock; and
   in the second position, the bypass valve blocks flow of the power fluid between the disengagement control valve and the differential lock and thereby prevents disengagement of the differential lock by the disengagement control valve while allowing flow of the power fluid directly from the power fluid source to the differential lock.

2. The system of claim 1 wherein the disengagement system disengages the differential lock in response to a low-traction event.

3. The system of claim 1 wherein the disengagement control valve comprises a solenoid valve capable of controlling flow of the power fluid to the differential lock.

4. The system of claim 1 wherein the power fluid is a pressurized gas.

5. The system of claim 1 wherein the bypass valve actuator moves the bypass valve to the second position by introduction of the power fluid to the bypass valve actuator of the valve.

6. The system of claim 5 wherein the introduction of the power fluid to the bypass valve actuator occurs in response to a vehicle condition change.

7. The system of claim 6 wherein the vehicle is a road/rail vehicle and the vehicle condition change is actuation of air bags during conversion of the road/rail vehicle to a rail mode of vehicle operation.

\* \* \* \* \*